US010803513B1

(12) United States Patent
Nazari et al.

(10) Patent No.: US 10,803,513 B1
(45) Date of Patent: Oct. 13, 2020

(54) FINANCIAL RESPONSIBILITY INDICATOR SYSTEM AND METHOD

(75) Inventors: Amir Adrian Nazari, Los Altos, CA (US); Sean Donn, Fremont, CA (US)

(73) Assignee: CREDIT SESAME, INC., Mountain View, CA (US)

( * ) Notice: Subject to any disclaimer, the term of this patent is extended or adjusted under 35 U.S.C. 154(b) by 571 days.

(21) Appl. No.: 13/620,592

(22) Filed: Sep. 14, 2012

Related U.S. Application Data

(60) Provisional application No. 61/535,935, filed on Sep. 16, 2011.

(51) Int. Cl.
*G06Q 40/00* (2012.01)

(52) U.S. Cl.
CPC .................... *G06Q 40/00* (2013.01)

(58) Field of Classification Search
CPC ...................................... G06Q 40/00
USPC ........................................... 705/35
See application file for complete search history.

(56) References Cited

U.S. PATENT DOCUMENTS

| | | | |
|---|---|---|---|
| 6,839,690 B1 | 1/2005 | Foth et al. | |
| 7,620,566 B2 | 11/2009 | Tenorio | |
| 8,001,040 B2 | 8/2011 | Keithley | |
| 8,682,837 B2 * | 3/2014 | Skelton | G06Q 10/04 706/52 |
| 8,694,420 B1 * | 4/2014 | Oliai | 705/38 |
| 2006/0212931 A1 * | 9/2006 | Shull | G06F 21/55 726/10 |
| 2007/0214259 A1 * | 9/2007 | Ahmed | G06Q 30/02 709/224 |
| 2007/0244808 A1 * | 10/2007 | Eze | 705/38 |
| 2008/0133391 A1 * | 6/2008 | Kurian | G06Q 40/02 705/35 |
| 2008/0133402 A1 * | 6/2008 | Kurian | G06Q 40/025 705/38 |
| 2008/0140441 A1 * | 6/2008 | Warner | G06Q 10/00 705/26.1 |
| 2008/0140442 A1 * | 6/2008 | Warner | G06Q 20/10 705/26.41 |
| 2008/0177655 A1 * | 7/2008 | Zalik | 705/38 |
| 2008/0249925 A1 * | 10/2008 | Nazari | G06Q 40/00 705/38 |
| 2009/0125439 A1 * | 5/2009 | Zarikian et al. | 705/38 |

(Continued)

OTHER PUBLICATIONS

"A Computational Model of Trust and Reputation," by Lik Mui; Mojdeh Mohtashemi; and Ari Halberstadt. Proceedings of the 35th Hawaii International Conference on System Sciences. HICSS '02, vol. 7, pp. 2431-2439, Jan. 7-10, 2002 (Jul. 1, 2002) (Year: 2002).*

(Continued)

*Primary Examiner* — Sara C Hamilton
(74) *Attorney, Agent, or Firm* — Chhabra Law Firm, PC

(57) ABSTRACT

A network device accesses a server via a network to collect information from a user and to verify identification of the user. Financial information of the user is accessed from one or more sources other than the user. An indicator of financial responsibility is assigned to the user based on the collected information and the accessed financial information of the user. The indicator of financial responsibility is disclosed to other persons under conditions selected by the user by communicating the indicator of financial responsibility via the network to one or more network devices.

17 Claims, 19 Drawing Sheets

(56) References Cited

U.S. PATENT DOCUMENTS

| | | | | |
|---|---|---|---|---|
| 2009/0299911 | A1* | 12/2009 | Abrahams | G06Q 40/00 705/36 R |
| 2009/0327120 | A1 | 12/2009 | Eze et al. | |
| 2009/0328173 | A1 | 12/2009 | Jakobson et al. | |
| 2010/0010826 | A1* | 1/2010 | Rosenthal | G06Q 99/00 705/1.1 |
| 2010/0114744 | A1* | 5/2010 | Gonen | 705/35 |
| 2010/0325057 | A1* | 12/2010 | Jain | G06Q 10/10 705/319 |
| 2011/0071857 | A1* | 3/2011 | Malov | G06Q 40/06 705/4 |
| 2011/0078073 | A1* | 3/2011 | Annappindi | 705/38 |
| 2011/0137789 | A1* | 6/2011 | Kortina | G06Q 20/405 705/38 |
| 2011/0313884 | A1* | 12/2011 | Eze | 705/26.41 |
| 2012/0182882 | A1* | 7/2012 | Chrapko | G06Q 30/02 370/248 |
| 2012/0215681 | A1* | 8/2012 | Jenkins | G06Q 40/00 705/38 |
| 2012/0317200 | A1* | 12/2012 | Chan | G06F 17/3064 709/204 |
| 2013/0066656 | A1* | 3/2013 | Hanson | G06Q 40/08 705/4 |
| 2013/0173457 | A1* | 7/2013 | Chrapko | G06Q 40/02 705/39 |

OTHER PUBLICATIONS

"A Novel Reputation Computing Model for Mobile Agent-Based E-Commerce Systems," by Zaobin Gan; Yijie Li; Guoqiang Xiao; Dengwen Wei. 2008 International Conference on Information Security and Assurance, ISA 2008, pp. 253-260, Apr. 24-26, 2008 (Apr. 24, 2008). (Year: 2008).*

"A Reputation System for Peer-to-Peer Networks," by Minaxi Gupta; Paul Judge and Mostafa Ammar. Proceedings of the 13th International Workshop on Network and Operating Systems Support for Digital Audio and Video NOSDAV'03, Monterey, California, USA. Jun. 1-3, 2003 (Jan. 6, 2003) (Year: 2003).*

"Reputation Management Framework and its use as Currency in Large-Scale Peer-to-Peer Networks," by Rohit Gupta and Arun K. Somani. Proceedings of the Fourth IEEE International Conference on Peer-to-Peer Computing P2P2004, Zurich, Switzerland, pp. 124-132. Aug. 25-27, 2004 (Aug. 25, 2004). (Year: 2004).*

* cited by examiner

FIG. 5 testtb@creditsesame.com My Account Log Out credit sesame overview | my finances | my goals | advice | blog | help

Credit Sesame Certified Credit Badge™ Program

The Credit Badge™ is designed to help you get a competitive edge in life by promoting your financial responsibility and showcasing your good credit standing.

Whether you are buying a car, renting an apartment, applying for a job, selling online or looking to stand out from the crowd, you can enhance your online personal brand by

- Earning an specialty badge from our Credit Badge™ program
- Sharing your badge online and promoting it on your personal profile pages

Feedback

Have an Idea, Problem, or Praise? We would like to hear from you. Please send feedback to:

feedback@creditsesame.com

Get the Scoop

Follow us on Twitter

Like us on Facebook

Badges You Can Earn

Good Badge

This badge certifies that you are a verified member of Credit Sesame with a Good credit rating. You can earn and maintain this badge as long as your credit score is between 680 and 739. As your credit score improves beyond that range, we will automatically update your Good badge to Excellent.

Excellent Badge

This badge certifies that you are a verified member of Credit Sesame with an Excellent credit rating. You can earn and maintain this badge as long as your credit score is 740 or higher. We will automatically update your Excellent badge to Guru as soon as you meet the Guru badge criteria detailed below.

● You have earned the Excellent Badge! | Share your badge

Guru Badge

This badge certifies that you are a verified member of Credit Sesame with an Excellent credit rating and you never miss a chance to save. You take advantage of your hardearned credit standing: a level of financial responsibility attained only by Credit Gurus. You can earn and maintain this badge if you have earned an Excellent badge, verified the accuracy of your financial information, and have the most competitive loans and credit cards in the market.

Verified Member Badge

Credit Sesame Member Badge

This badge certifies that you are a verified member of Credit Sesame and actively managing your credit and loans. You earn this badge automatically when you sign up for Credit Sesame. As long as you are an active member of Credit Sesame, the verified member badge is active and can be shared at any time!

● You have earned the Verified Member Badge! | Share your badge

FIG. 6

Help | Privacy Policy | Terms of Use | About Us

© 2010 - 2011 Credit Sesame, Inc. | All Rights Reserved

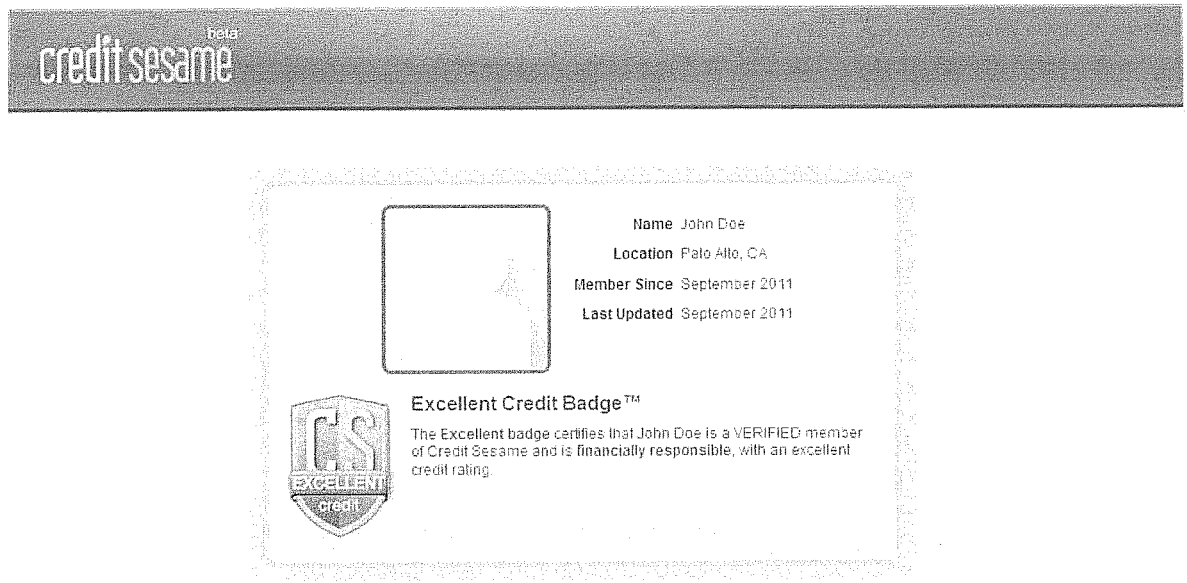

The Credit Sesame Credit Badge™ Program

Get Your Own *Free* Badge! Showcase your financial responsibility and enhance your personal brand with Credit Sesame's Credit Badge™ program! Learn more It's safe, secure, and only takes a minute to sign up!   Sign Up, It's Free!

 It's Free, Safe & Secure
It only takes a minute to sign up for Free. We use bank-level security to safeguard your information every step of the way

 Get an Edge in Life
Instantly get your credit score and keep it updated monthly for free. Earn four levels of badges based on your credit rating and how well you manage your loans and debt. Plus, get your personalized Credit Badge™ certificate to share with others.

 Easily Share Your Badge
Badges are private by default but you can easily share and promote your badge on Twitter, Facebook and other social networks. Embed it on your blog or public profile pages.

 Promote Your Financial Good Sense
Whether you're applying for a new job, renting, transacting commerce online, or interacting with someone on the web for business or personal reasons, stand out from the crowd with Credit Sesame's Credit Badge™ program.
Credit Sesame is the best way to manage your credit and save money on loans, mortgages and credit card debt with pre-qualified advice, tailored to your credit profile - all for free! Learn more

About Credit Sesame's Credit Badge™ Program
The Credit Badge™ program certifies your financial responsibility based on your credit rating and how effectively you manage your credit and loans.

Sign Up, It's Free!

Help | Privacy Policy | Terms of Use | About Us

© 2010 - 2011 Credit Sesame, Inc. All Rights Reserved.

FINANCIAL RESPONSIBILITY INDICATOR SYSTEM AND METHOD

This application claims the benefit of U.S. Provisional Application No. 61/535,935 filed Sep. 16, 2011, the entire contents of which are hereby incorporated by reference.

BACKGROUND OF THE INVENTION

The present invention relates to the field of computer-assisted financial services and, more particularly, to providing crediting checking, financial analysis and information services via a computer network.

Increasingly, business and social interactions occur via computer networks, and more specifically via the Internet. Many people have an online persona, or brand, which can be embodied in a blog, a social or business networking profile, or simply an account on a dating website. In addition, many daily activities take place online, including buying and selling products and services, job and house hunting, and interacting with friends and coworkers, that a person's web presence can be nearly as important as a person's "real-life" presence.

A challenge to online interactions is that it can be difficult to determine the financial responsibility, trustworthiness, social responsibility and similar attributes of other persons that are potential partners in a prospective business transaction or social interaction. In such situations, there is a natural tendency on the part of all parties to avoid disclosing too much personal information without first knowing more about the person or persons that will be receiving such information.

Therefore, what is needed is a secure way to communicate financial responsibility, trustworthiness, social responsibility and similar attributes via a computer network.

SUMMARY OF THE INVENTION

The present invention provides a system and a method for authenticating a person's identity and for assigning to the person an indicator of the person's responsibility. The present invention allows the person to share the indicator via a computer network so as to convey the person's responsibility to others.

In accordance with an embodiment of the present invention, a network device accesses a server via a network to collect information from a user and to verify identification of the user. Financial information of the user is accessed from one or more sources other than the user. An indicator of financial responsibility is assigned to the user based on the collected information and the accessed financial information of the user. The indicator of financial responsibility is disclosed to other persons under conditions selected by the user by communicating the indicator of financial responsibility via the network to one or more network devices.

BRIEF DESCRIPTION OF THE DRAWINGS

The present invention is described with respect to particular exemplary embodiments thereof and reference is accordingly made to the drawings in which:

FIG. 2 illustrates an exemplary opening web page that may be displayed to a user in accordance with an embodiment of the present invention;

Figure 4:
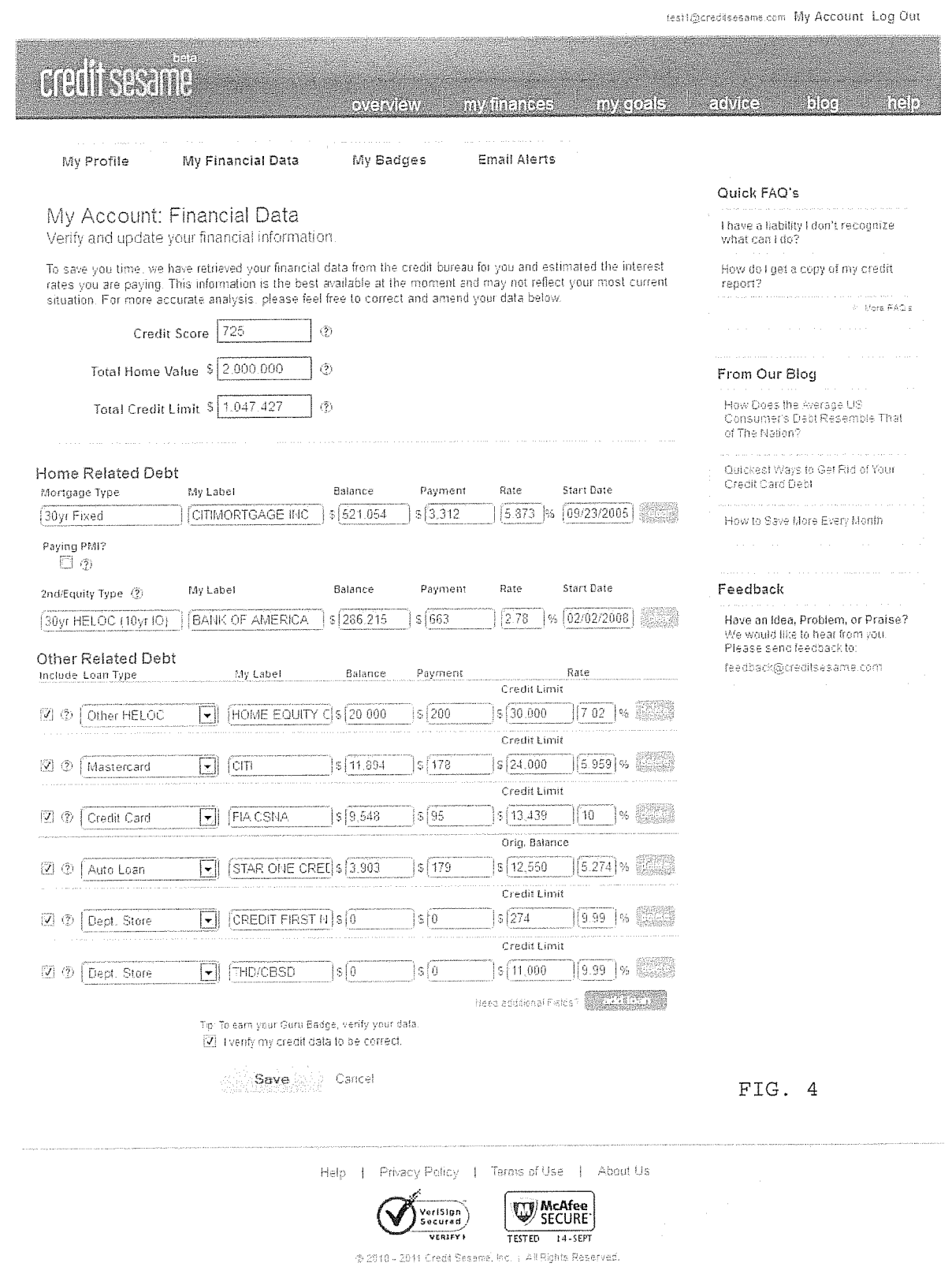

FIG. 4 illustrates a web page showing financial data of a user in accordance with an embodiment of the present invention;

FIG. 5 illustrates a web page showing a credit analysis of a user in accordance with an embodiment of the present invention;

FIG. 6 illustrates a web page showing badge indicators of financial responsibility in accordance with an embodiment of the present invention;

FIG. 9 illustrates a web page showing a preview of an "excellent" level badge for a user in accordance with an embodiment of the present invention;

FIG. 10 illustrates a web page showing user-selectable settings in accordance with an embodiment of the present invention;

FIG. 12 illustrates a web page showing selection of a badge for sharing in accordance with an embodiment of the present invention;

FIG. 13 illustrates a web page showing a process for adding a profile picture in accordance with an embodiment of the present invention;

FIGS. 18A and 18B illustrates a web page showing an overview of a user's finances in accordance with an embodiment of the present invention.

DETAILED DESCRIPTION OF A PREFERRED EMBODIMENT OF THE INVENTION

The present invention provides a system and a method for authenticating a person's identity and for assigning to the person an indicator of the person's responsibility and, more particularly, the person's financial responsibility. The present invention allows the person to share the indicator via a computer network so as to convey the person's responsibility to others. The invention provides a convenient and secure way for persons to share and show their good sense to others. As used herein, the term "financial responsibility" refers to the manner which a person handles his or her finances and represents the degree of proficiency and reliability exhibited by the person with respect to his or her finances. Financial responsibility additionally refers to a person's financial fitness which represents the person's ability to repay new or existing obligations. The indicator can be determined based a person's financial information, such as credit score, debt portfolio, debt-to-income ratio, assets and other factors. Indicators can be displayed on a resume, in social and professional networking profiles, ecommerce and dating profiles, and elsewhere. The invention is useful for persons applying for a new job, employers seeking responsible employment candidates, for transacting business online, for potential renters seeking to show their responsibility to potential landlords, landlords seeking to identify responsible tenants, and for interacting online for social reasons. The present invention also allows users to better understand and improve their credit.

Figure 1:
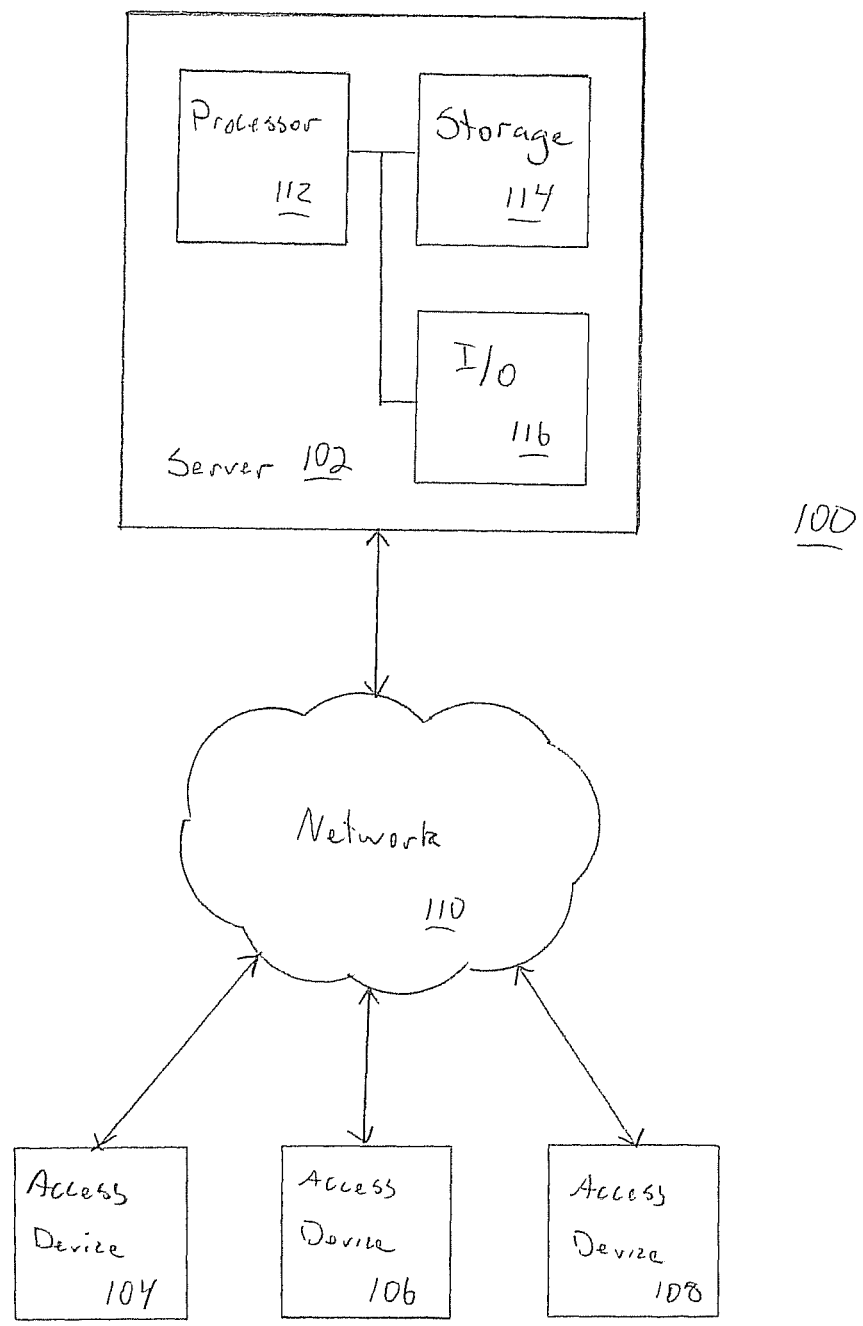
FIG. 1 illustrates a system that may be used to implement methods described herein in accordance with embodiments of the present invention.

In an exemplary embodiment, the present invention can be implemented in the context of an electronic commerce system in which consumers access a website for performing crediting checking and financial analysis as well as methods and other functionality as described herein. FIG. 1 illustrates a system 100 that may be used to implement the methods and functionality described herein. As shown in FIG. 1, a server 102 is communicatively coupled to a plurality of remote network devices 104, 106, and 108 via a network 110. The server 102 includes a processor 112, data and program storage 114 and input/output devices 116, which may include, for example, a display, a keyboard, a mouse, and a network interface. The server 102 is preferably under the control of an operator of the financial responsibility indicator system. The network 110 may include, for example, a local area network, an intranet, and/or a wide area network, such as the Internet. The remote access network devices 104, 106, 108, may be implemented as various computing devices, such a desktop or portable personal computer, a "smart" phone, tablet computer, a personal digital assistant (PDA) or other device. A user accesses the server 102 by using a remote access device 104, 106 or 108. For example, the server 102 may host website portal which can be accessed by users of the devices 104, 106 or 108. The devices 104, 106, 108 may communicate with the server 102 and with each other and other devices by wireless or wired connections. While a single server 102 is shown, it will be understood that the functions of the server 102 may be performed by multiple servers or by a distributed server system.

Figure 2:
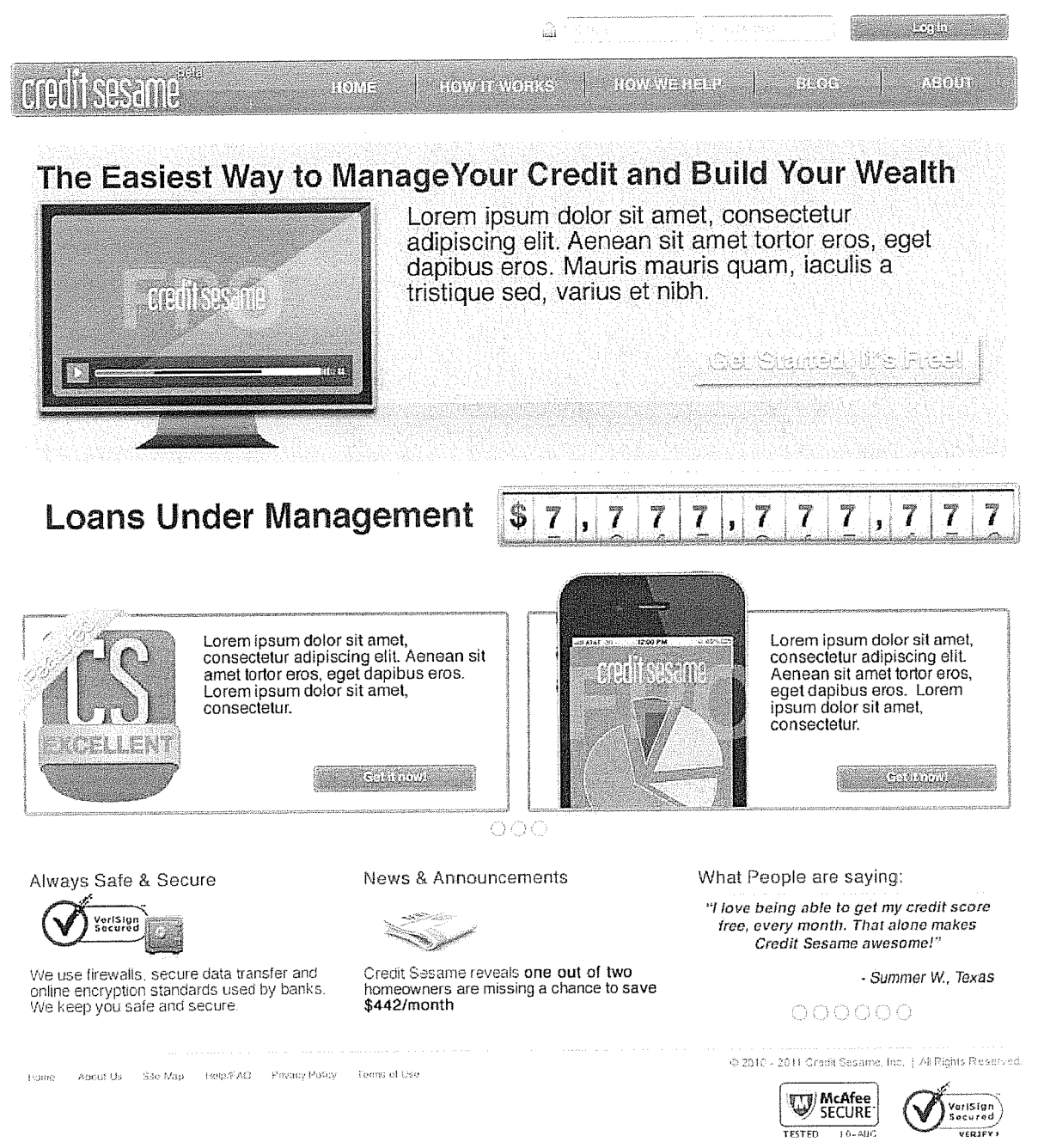

FIG. 2 illustrates an exemplary opening web page that may be displayed to a user in accordance with an embodiment of the present invention. Upon visiting the web page, a user may begin a process of obtaining an indicator of financial responsibility, also referred to herein as a "badge," and may selectively share the indicator with others, as described herein. The web page of FIG. 2 and others described herein may be stored and displayed by the server 102 (FIG. 1). The user can access the web page by using an access device 104, 106 or 108 (FIG. 1). Financial data and other information discussed herein may be stored in storage 114.

The user may select a link from the opening web page which begins a sign-up, identity verification and data collection process. The user may then be asked to provide his or her email address, a user name and an account password. A user's email address can serve as the user name. A unique account is assigned to the user. The password is used by the user for logging into his or her account.

The user is asked to provide his or her full legal name, current residence address, an indication as to whether the user owns or rents his or her residence, his or her full social security number, as well as indication that the user understands and agrees to allow a credit check to be performed. This information can be stored at the server 102 (FIG. 1)

Information collected from the user can be transmitted to a credit reporting agency. The information can be transmitted from the server 102 to the credit reporting agency's computer systems (not shown). For example, the three recognized nationwide reporting agencies are Equifax, Experian, and Trans Union. The credit reporting agency can then use the information to access its credit report for the user. The user can be further authenticated by using information from the credit report to generate authentication questions for the user for which only the user is likely to know the answers. These can be, for example, multiple choice questions relating to the amount of the monthly payment on a current loan of the user or the street address of a former residence of the user. The credit reporting agency can generate these questions which can then be displayed for the user. Answers to the questions can be relayed by the server 102 to the credit reporting agency which determines whether the questions are correctly answered. Once the user correctly answers a sufficient number of these questions, e.g., the user correctly answers the first three out of three such questions, or the user correctly answers a total of three out of five questions, then the user is authenticated.

The user's identification can be authenticated through additional or alternative methods. For example, the user may be asked to provide information about himself or herself that is then compared to information obtained from another source. This other source can be government documents, employment records, etc.

Once the user is authenticated, information from the user's credit report can be communicated from the credit reporting agency. This can include the user's credit score. For example, the credit report information can be received at the server 102 (FIG. 1). In addition to the credit report information, additional information can be obtained form other sources regarding the user. For example, real property records can be accessed using the user's provided residence address. These records can be obtained from databases maintained by public agencies such as tax collectors or recorder's offices. These records can alternatively or additionally be obtained from databases maintained by private organizations. Such records can provide, for example, as estimate of the value of real property owned by the user, as well as its size and information regarding any loans taken out on the property. Additional information can also be collected from the user.

Figure 3:
FIG. 3 illustrates a web page showing a summary of a user's finances in accordance with an embodiment of the present invention.

A summary of the user's information, and particularly the user's financial information, can be displayed for the user. FIG. 3 illustrates a web page showing a summary of a user's finances in accordance with an embodiment of the present invention. As shown in FIG. 3, the user's credit score, total monthly debt payments and home value can be displayed along with the user's badge level. Additional information regarding the user's loans can be displayed, such as list of loans and outstanding balances and monthly payment for each.

Using information obtained from the user's credit report, and any additional information collected, an analysis of this information can be performed. This can include making a determination regarding the user's level of financial responsibility. For example, the levels can be designated as: "verified," "good," "excellent" and "guru." The "guru" level can also be referred as "excellent." In a preferred embodiment, every user that successfully completes the verification process is assigned a "verified" or "member" rating and can also be assigned any of the other ratings ("good," "excellent" or "guru").

The user's credit score can be used, by itself, to determine the user's level of financial responsibility. For example, if the user's credit score is below a first threshold (e.g. 679 and below), then the user may assigned only the "verified" level. If the user's credit score falls within a range of values above the first threshold, (e.g., 680-739), then the user may be assigned the "good" level. If the user's credit score is above a second threshold, higher than the range of values (e.g., 740 and above), then the user may be assigned the "excellent" level. User's that receive the "good" and "excellent" levels can also receive the "verified" status. Thus, the "good" and "excellent" levels can be in addition to the "verified" status.

The "verified" rating can indicate that the user's identity was successfully authenticated and that user has a valid credit report which shows that the user is actively managing his or her credit and loans. The "good" rating can additionally show that the user has a good credit rating. The "excellent" rating can additionally show that the user has an "excellent" credit rating, higher than the "good" rating.

Information in addition to the user's credit score can be considered. For example, if the user's credit score is above the second threshold, (e.g., 740 and above), and the user meet additional criteria that indicates financial responsibility or knowledge, then the user can be assigned the "guru" or "outstanding" level. The "guru" level can be in addition to the "verified" status. Thus, the "guru" rating can additionally show that the user has an "excellent" credit rating and is outstanding in terms of managing his or her credit and debt.

The "guru" credit rating can, for example, indicate that the user has an "excellent" credit and that the user's loan and debt portfolio is optimized (e.g. the user is already taking advantage of the most suitable loan products available for his or her financial situation). For example, to determine whether the "guru" level applies, an analysis may be performed on the user's debt portfolio. Such an analysis may be performed in accordance with U.S. Patent Publication No. 2008/0249925, entitled, "Liability Advice System and Method," the entire contents of which are hereby incorporated by reference. If the analysis determines that there is not significant room for improvement, for example, if there are no opportunities to lower the user's monthly debt payments or generate savings based on the user's financial profile, goals and currently available debt products, then the user may be assigned the "guru" level. It will be apparent that other criteria can be applied to assign levels of financial responsibility to users, such as total debt to income ratio, monthly debt payments to income ratio, etc.

In an embodiment, the thresholds and ranges of credit scores used for assigning levels of financial responsibility can all be adjusted over time so that the assigned levels of financial responsibility reflect the currently prevailing attitudes of lenders as to how the credit scores measure lending risk. For example, in the current economic crisis, lenders have generally made their lending criteria more stringent. Thus, in the past, a borrower with a credit score of 620 may have generally been considered by lenders to be low risk borrower, whereas, currently many lenders require a credit score of 680 or higher to consider a borrower as having low risk. In the future, the prevailing views of lenders may change as to how a borrower's credit score relates to risk of default. So that the levels of financial responsibility assigned in accordance with the present invention reflect the current prevailing views of risk, the thresholds and ranges of credit scores used to assign levels of financial responsibility are preferably adjusted up or down over time.

Other information can be considered instead of, or in addition to the user's credit score. For example, data from a person's peer group can be used to determine financial fitness and responsibility. The peer group may be defined by reference to a variety of factors, such as a person's age group, geographic region such as zip code, income level, credit score level, whether or not they are a homeowner and other demographic characteristics such as gender, education level, ethnicity. Thus, how the user's financial information compares to that of other persons in his or her peer group can be used to determine the user's level of financial responsibility.

As other examples of using information in addition to the user's score to assign levels of financial responsibility, the user's loan to asset values, debt level and credit usage, debt payment to income ratios, interest rates on their loans, terms and conditions of their loans and how their loan terms compare to prevailing terms for comparable loans in the market can be used and possibility combined with other financial information, such as the user's credit score, to determine which of the categories or levels of financial responsibility is to be assigned to the user.

Because the assigned level represents financial responsibility, it can be considered to approximate the trustworthiness, social responsibility, financial fitness and similar attributes of the user.

Figure 5:
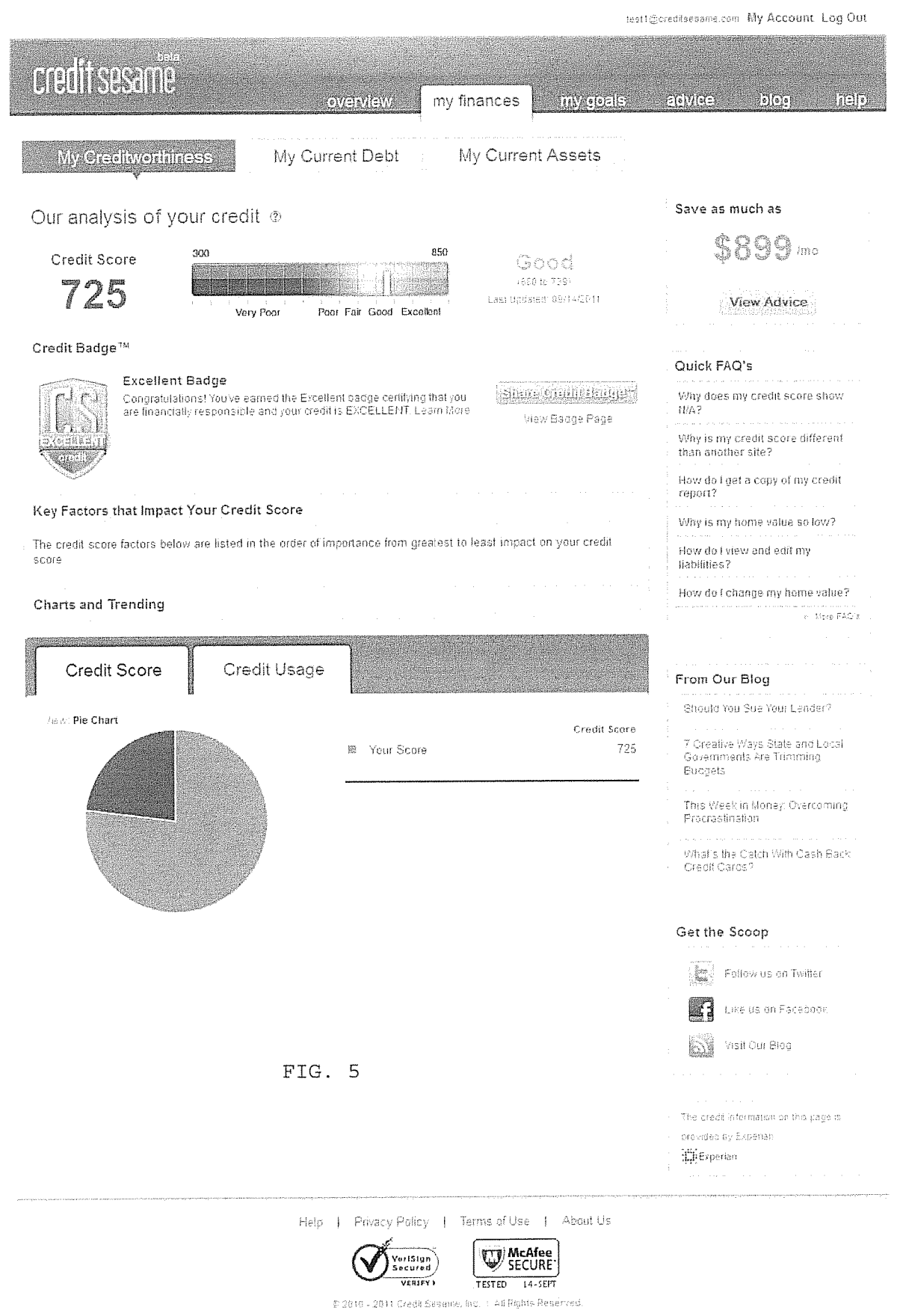

FIG. 5 illustrates a web page showing an exemplary credit analysis of a user in accordance with an embodiment of the present invention. For example, various factors which influenced the assigned level of financial responsibility can be displayed along with information that may assist the user in obtaining a higher level indicator. Additionally, changes from a most-recent prior analysis can be displayed which can assist the user to determine whether or not their financial responsibility is heading in the right direction by improving.

FIG. 6 illustrates a web page showing badge indicators of financial responsibility in accordance with an embodiment of the present invention. As shown in FIG. 6, each level of financial responsibility has a corresponding badge suitable for display. In an embodiment, three levels can be assigned in addition to the base, "verified" level. However, it will be apparent that more or fewer levels may be assigned.

Figure 7:
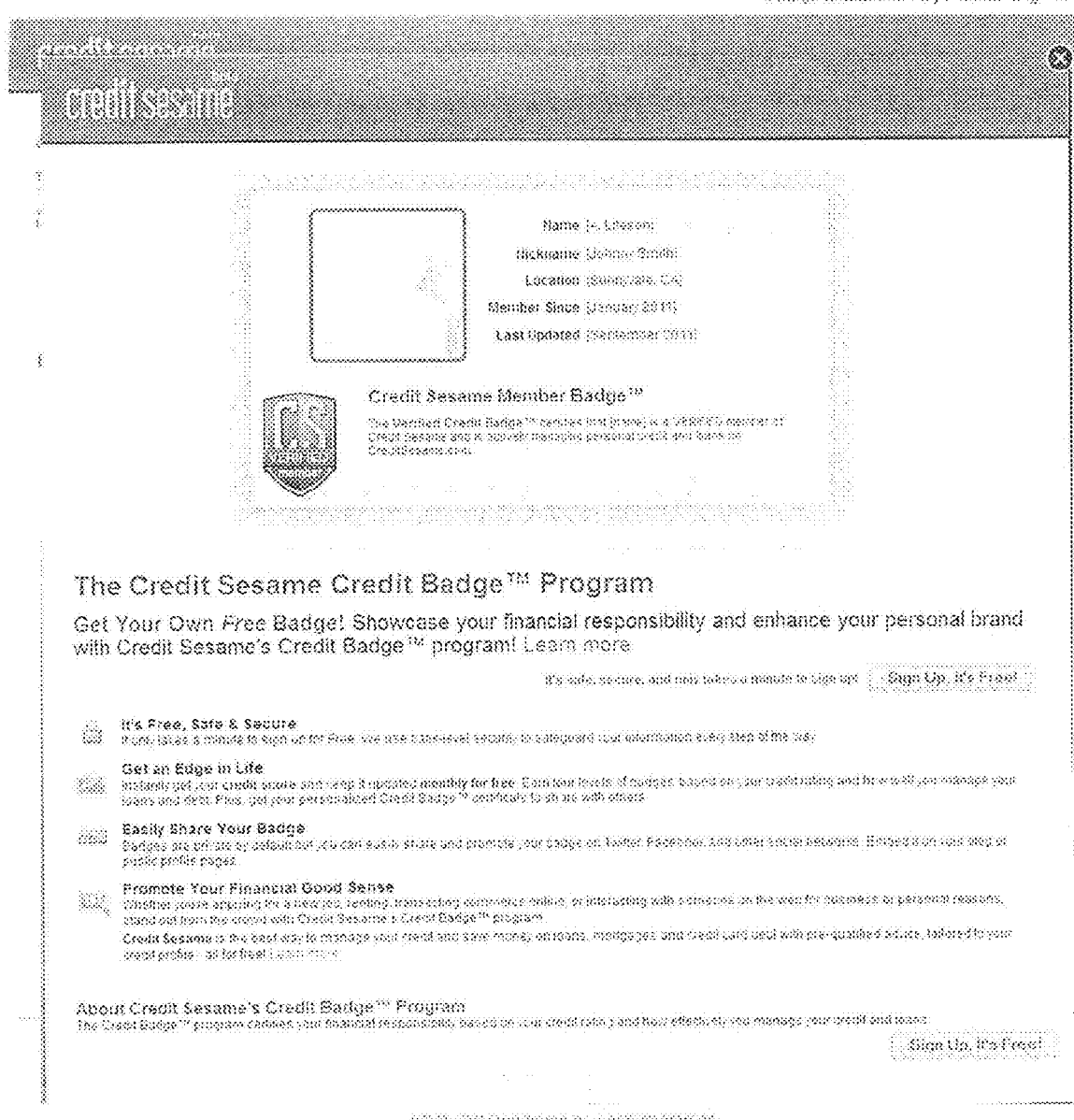
FIG. 7 illustrates a web page showing a preview of a "member" level badge for a user in accordance with an embodiment of the present invention.
Figure 8:
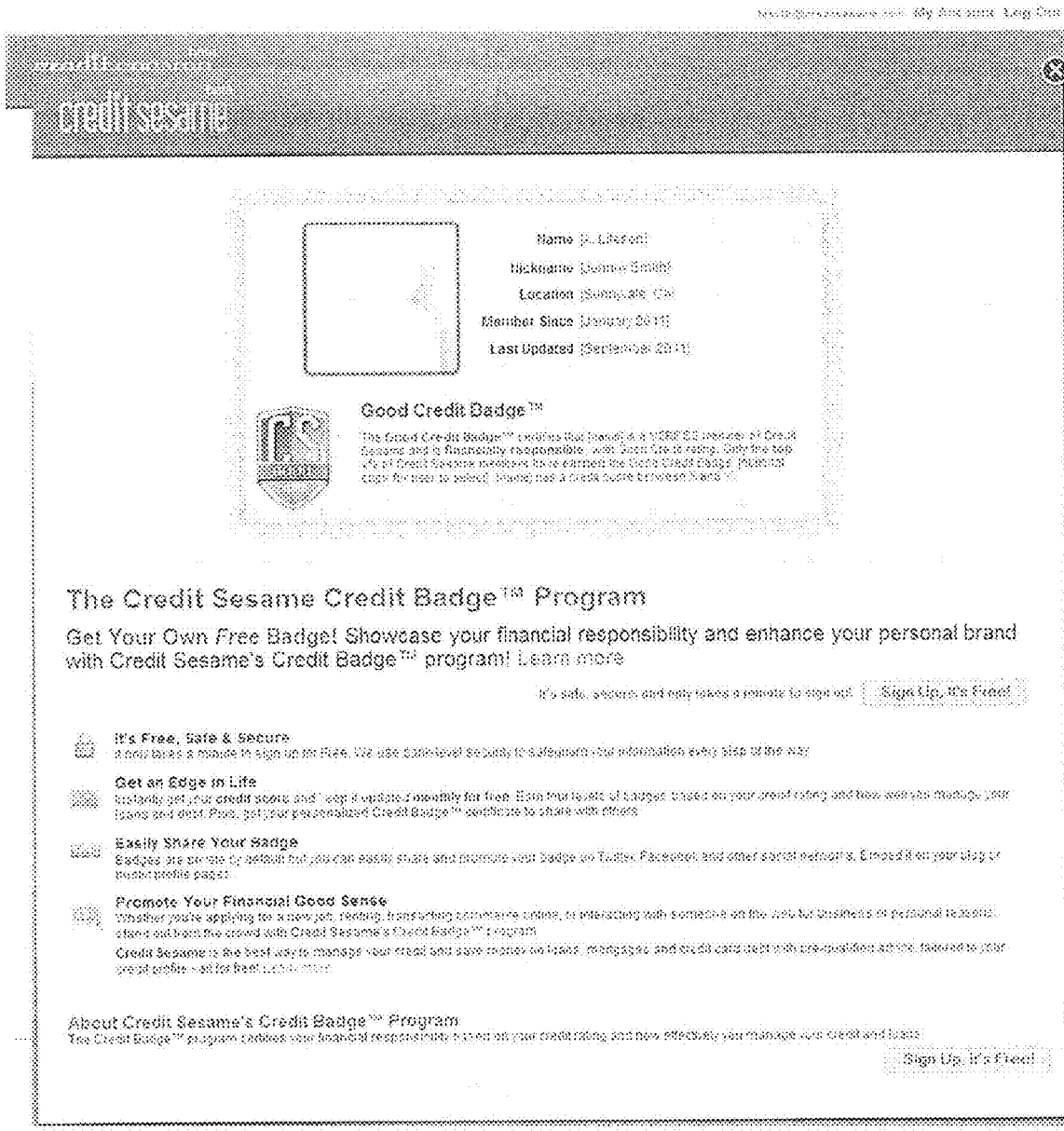
FIG. 8 illustrates a web page showing a preview of a "good" level badge for a user in accordance with an embodiment of the present invention.

Once a particular level financial responsibility is assigned to the user, the user can selectively share his or her assigned level by displaying the corresponding badge for others to review. The user can also selectively preview the badge that will be shown to others as well as the display option settings. FIG. 7 illustrates a web page showing a preview of a "member" level badge for a user in accordance with an embodiment of the present invention. FIG. 8 illustrates a web page showing a preview of a "good" level badge for a user in accordance with an embodiment of the present invention. FIG. 9 illustrates a web page showing a preview of an "excellent" level badge for a user in accordance with an embodiment of the present invention.

Figure 10:
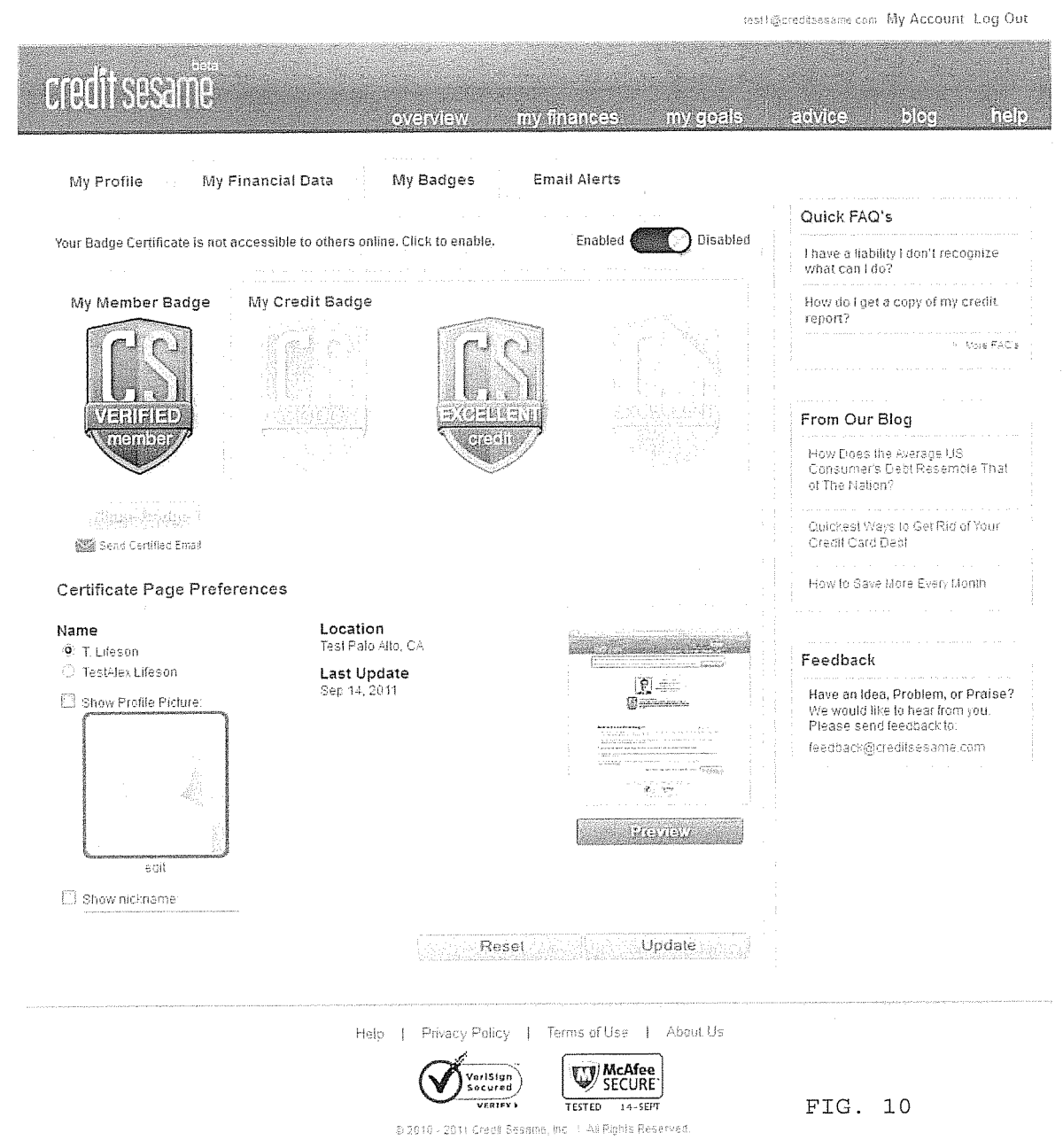

FIG. 10 illustrates a web page showing user-selectable display option settings in accordance with an embodiment of the present invention. As shown in FIG. 10, the user-selectable settings can include display of a photo of the user and a nickname of the user. In addition, if the user is assigned a badge in addition to the "member" level badge, the user can select which badge is to be shared with others. In the example of FIG. 10, the user is assigned the "excellent" level badge. This badge is preferably displayed in highlighted form with the other, unassigned badges displayed without highlighting (e.g., they are shown more faintly). In this case, the user can see the other badge levels, particularly the higher badge level(s), which is likely to cause the user to be more motivated to improve his or her financial responsibility so as to achieve a higher badge level. The user can also selectively enable and disable the sharing. FIG. 10 shows the sharing function disabled.

Figure 11:
FIG. 11 illustrates a web page showing a "sharing" selection being enabled in accordance with an embodiment of the present invention.
Figure 12:
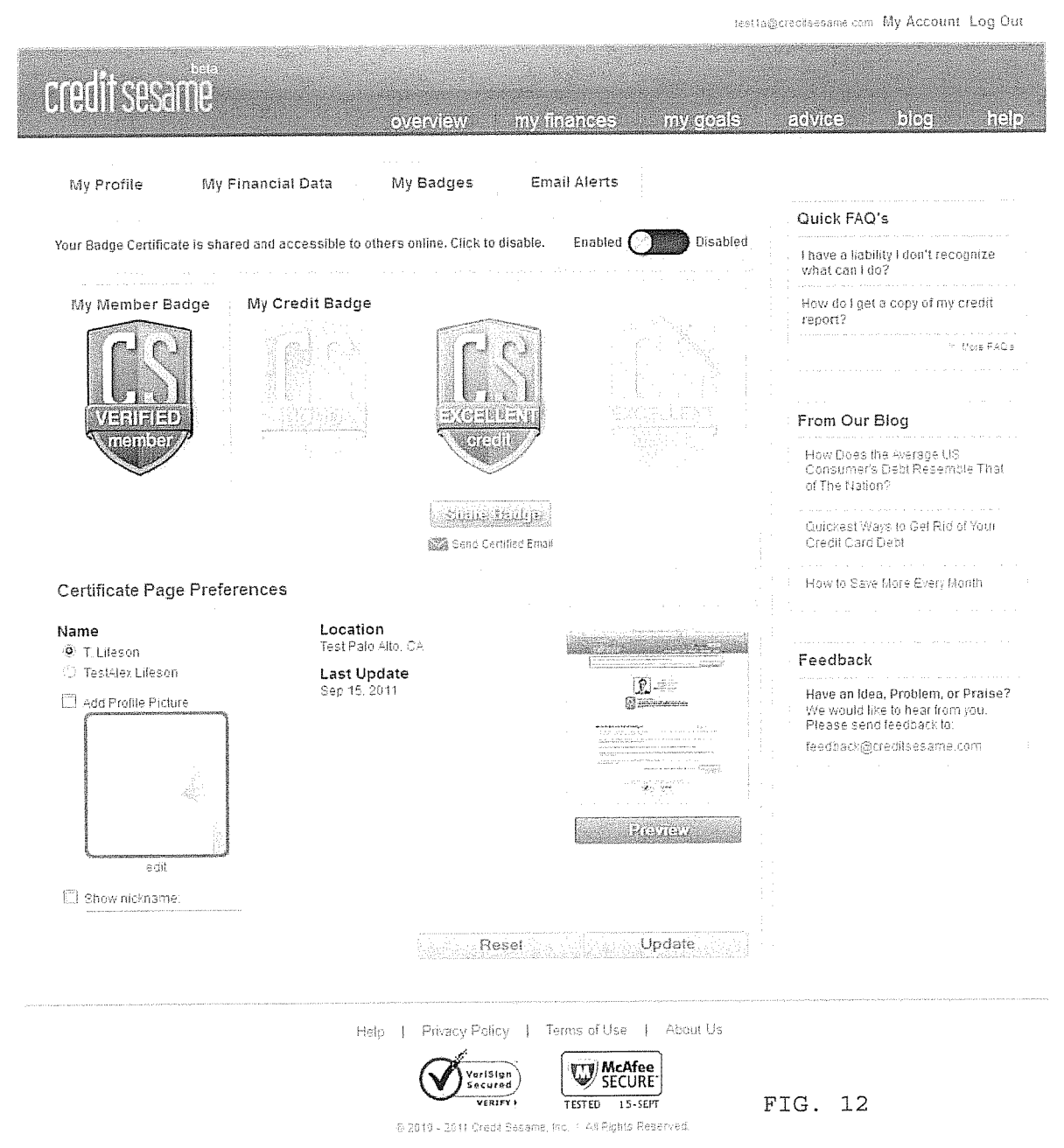
Figure 13:
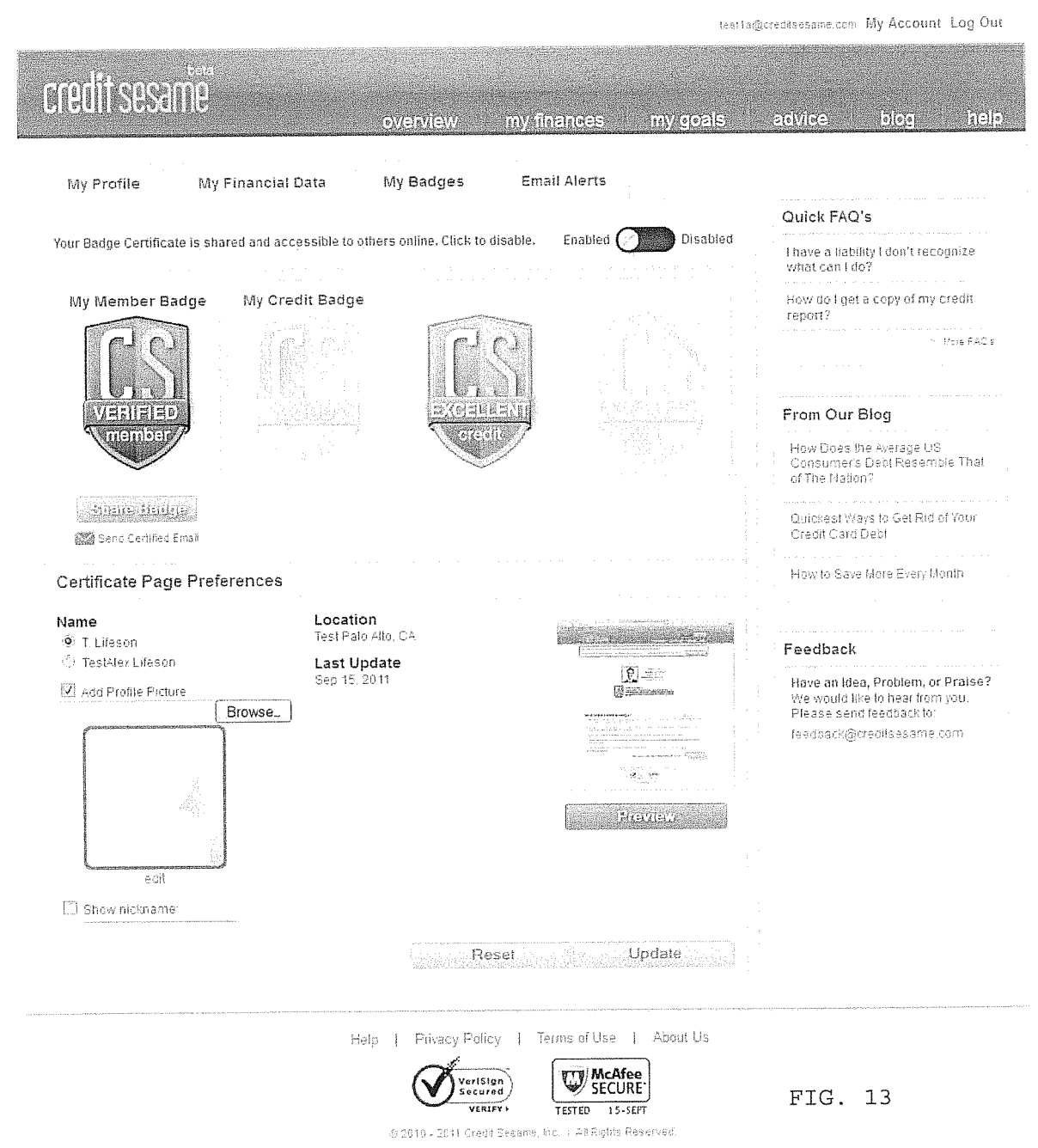
Figure 14:
FIG. 14 illustrates a web page showing a profile picture in accordance with an embodiment of the present invention.

FIG. 11 illustrates a web page showing a "sharing" selection being enabled in accordance with an embodiment of the present invention. FIG. 12 illustrates a web page showing selection of a badge for sharing in accordance with an embodiment of the present invention. As shown in FIG. 12, the user has selected the "excellent" badge for sharing. FIG. 13 shows that the user has selected the "member" badge for sharing. FIG. 13 also illustrates a web page showing a process for adding a profile picture in accordance with an embodiment of the present invention. FIG. 14 illustrates a web page showing a profile picture in accordance with an embodiment of the present invention.

If user elects not to share his or her badge, then the user can disable the sharing functionality. This is shown FIG. 14.

Figure 15:
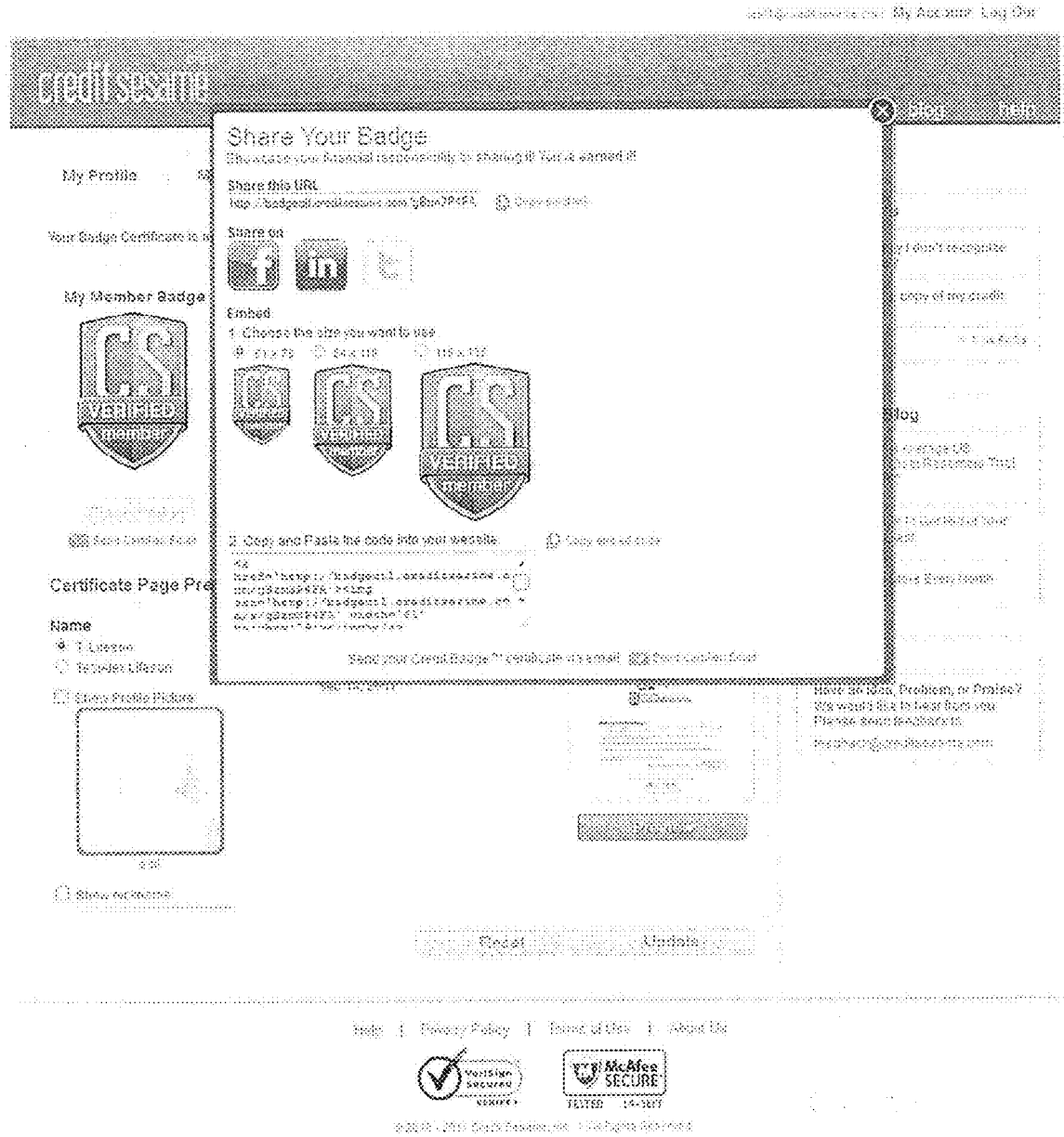
FIG. 15 illustrates a dialog box for embedded sharing of a badge and for sharing a badge via a web link in accordance with an embodiment of the present invention.

A user can share his or her badge in various ways. This can include, for example, embedding a badge link or graphic icon which represents the badge in a personal web site or web page. FIG. 15 illustrates a dialog box for embedded sharing of a badge and for sharing a badge via a web link in accordance with an embodiment of the present invention. As shown in FIG. 15, a dialog box is displayed though which the user can select the size at which the embedded badge is displayed. The dialog box can also provide HTML code that that user can cut and paste into his or her personal web site or web page so that the badge will be displayed there.

A user can share his or her badge via a web link. In this case, a dialog box can provide a web link that the user can provide to others. For example, as shown in FIG. 15, the user can copy and paste the web link into the body of an email or text message. Upon receiving such a message, the recipient can select the link which then causes the recipient's access device to link to a web page showing the user badge. This web page is preferably operated by the operator of the financial responsibility indicator system and is, therefore, resistant to tampering. FIGS. 7, 8 and 9 illustrate web page that may be displayed upon linking to a user's badge in accordance with an embodiment of the present invention.

A user can preferably share his or her badge by displaying the badge on third-party operated websites, such as his or her profile page in social networking web sites such as LINKEDIN, TWITTER, FACEBOOK or others. FIG. 15 shows sharing options for such social networking websites.

Figure 16:
FIG. 16 illustrates a dialog box for sharing a badge via secure email in accordance with an embodiment of the present invention.
Figure 17:
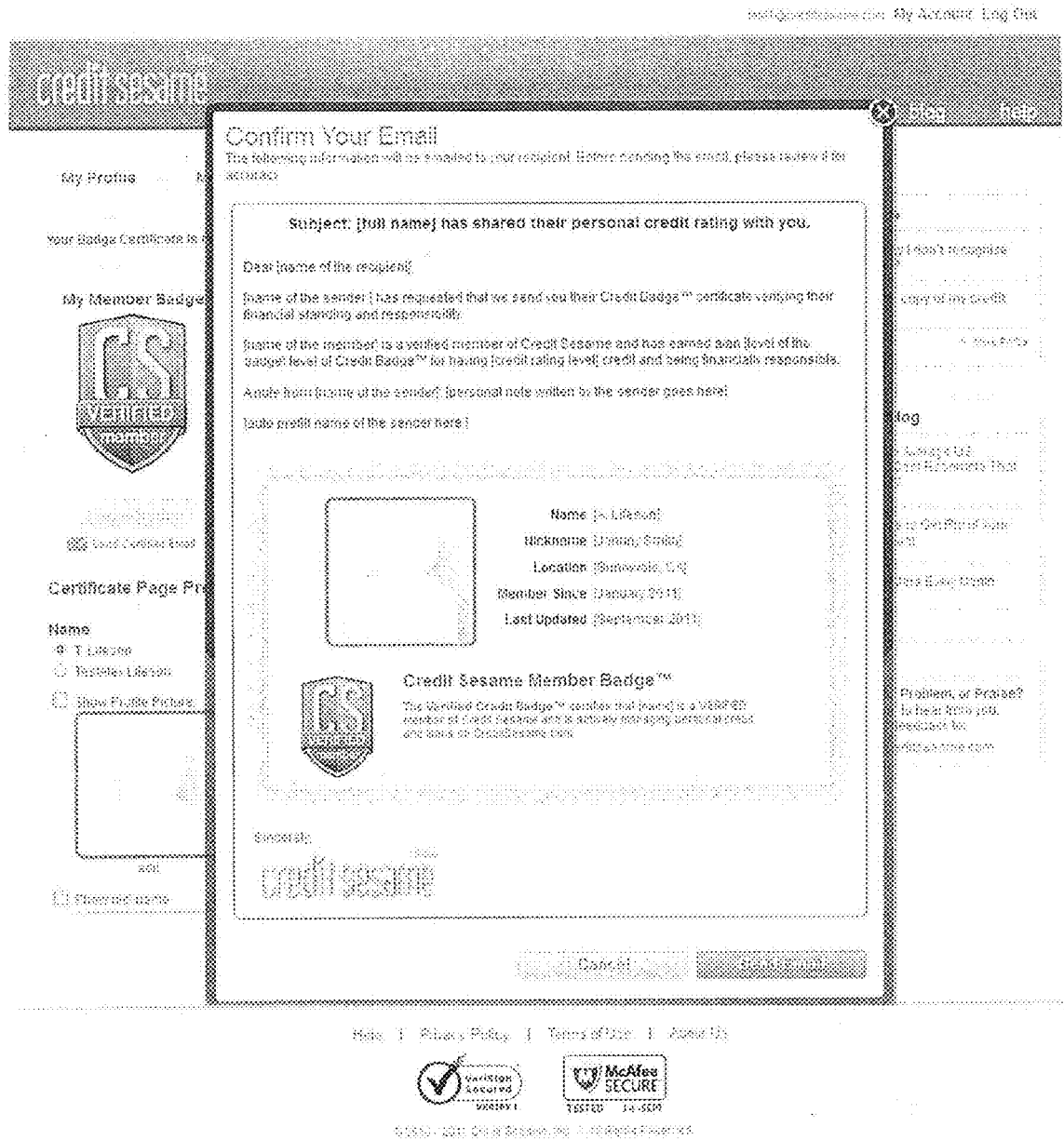
FIG. 17 illustrates a web page showing a preview of an email message in accordance with an embodiment of the present invention.

A user can share his or her badge by sending a secure email message. FIG. 16 illustrates a dialog box for sharing a badge via secure email in accordance with an embodiment of the present invention. As shown in FIG. 16, a dialog box allows a user to compose a secure email message. In addition, the user can make selections that affect features of the email message. For example, the user can selectively show his or her profile photo, nickname, credit score, address or other attributes in the email message. FIG. 17 illustrates a web page showing a preview of an email message in accordance with an embodiment of the present invention. The email message is preferably sent by the operator of the financial responsibility indicator system and is, therefore, resistant to tampering. Once a secure email message is sent, delivered or read, the user preferably receives confirmation that it was sent, delivered or read.

In an embodiment, privacy options are associated with sharing and display of a user's badge. This can allow the user to display his or her badge without disclosing his or her full identity. For example, users such as bloggers and website operators can share their badges along with a pseudonym or business name associated with the badge. In this case, a user can use the badge as an indication to others that he or she has been verified (and optionally to share the user's level of responsibility) even if the user is using a public identity that is different than his or her legal name.

Figure 18A:
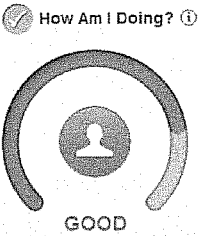
Figure 18B:
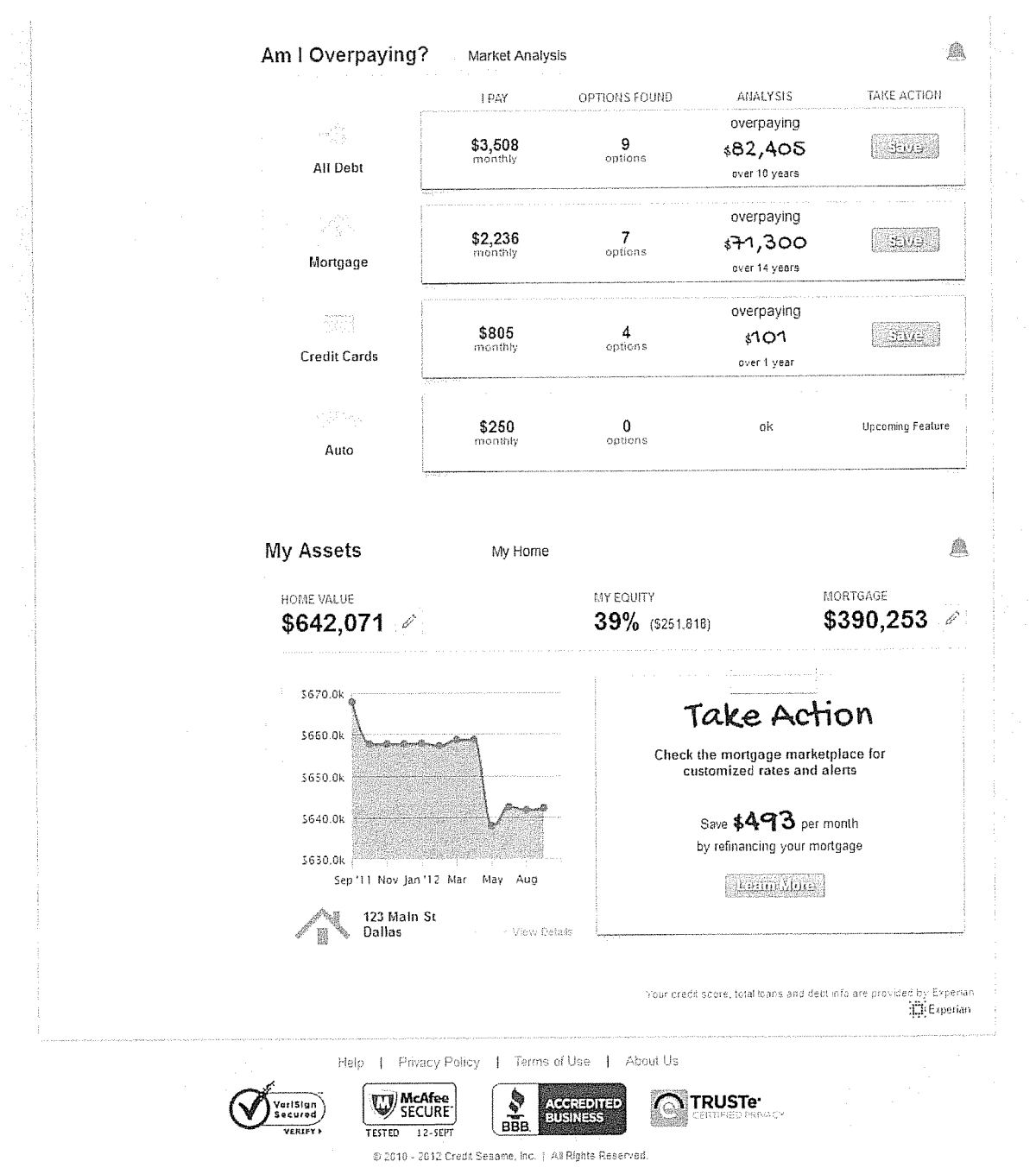

FIGS. 18A and 18B illustrates a web page showing an overview of a user's finances in accordance with an embodiment of the present invention. Similarly to FIG. 3, the user's credit score, total monthly debt payments and home value can be displayed along with the user's badge level. FIGS. 18A and 18B shows that a comparison of the user's current debt instruments to currently available alternatives may be performed and displayed. Specifically, for each type of debt (e.g. mortgage, credit cards and auto loans), the user's current monthly payment can be determined and displayed. In addition, one or more currently available alternative loans may be identified and an overall cost difference between the user's current loan and a selected one of the alternative loans (e.g. the one with the greatest cost savings) can be determined and displayed. The cost difference may be determined for specified time period (e.g. ten years). For example, as shown in FIG. 18B, the user's current mortgage has a monthly payment of $2,236. However, an analysis of currently available loan products determines that the user could refinance this loan to a more favorable loan such that the user can save $71,300 over a period of 14 years. Additionally, a link is provided that the user can active to initiate the process of applying for a more favorable loan. In an embodiment, the user's total monthly payment for all sources of debt is displayed as well as a potential savings should the user seek to refinance all of this debt using currently available loan products. For example, as shown in FIG. 18B, the user's current monthly payment for all debt is $3,508, whereas, the user could potentially save $82,405 over a period of 10 years should the user refinance all of the debts into more favorable loans. Thus, a comparison of the user's current debt instruments to currently-available alternative debt instruments is performed and displayed. This information is useful for at least two reasons. First, how well the user in managing his or her finances can be determined, at least in part, by how the user's current loan products compare to the market. This information can be used as a portion of the information that is used to assign a level of financial responsibility to the user. Thus, as explained herein if the user's loan and debt portfolio is optimized (e.g. the user is already taking advantage of the most suitable and cost-effective loan products available for his or her financial situation) this indicates that the user is managing his or her finances well. Conversely, if the user is not taking advantage of the most suitable and cost-effective loan products, this indicates that the user is not managing his or her finances as well. Second, the comparison of the user's current debt instruments to currently-available alternative debt instruments provides information that the user can readily act upon to obtain more favorable loan terms, which can have the two-fold benefit of saving money for the user and improving the user's determined level of financial responsibility.

As shown in FIGS. 18A and 18B, four categories of information related to the user's finances is analyzed and displayed. The first category, labeled "My Credit" in FIG. 18A, represents a credit score. The second category, labeled "My Debt" in FIG. 18A, represents the user's overall debt and/or debt to income ratio. The third category, labeled "Am I Overpaying" in FIG. 18A, represents a comparison of the user's current debt instruments to the market. The fourth category, labeled "My Assets" in FIG. 18B, represents the user's assets. In an embodiment of the present invention, any combination of information from two or more of these categories can be used to determine the user's level of financial responsibility. Thus, for example, the credit score for the user, the level of debt for the user, and the comparison of the user's current debt instruments to currently-available alternative debt instruments can be used to determine the user's level of level responsibility. In this example, three of the categories of information are used to determine the user's level of responsibility. However, in this embodiment, all four categories may be analyzed and displayed. In other embodiments, more or fewer categories of information may be analyzed and displayed.

As is also shown in FIGS. 18A and 18B, additional information regarding the user's financial situation can be displayed, such as links to take action with respect to each of the four categories of information displayed. As also shown in FIG. 18A, results of analysis of the user's financial information can be displayed in summary fashion. This information is shown in FIG. 18A adjacent to the user's overall level of financial responsibility (which is "good" is this example). More specifically, the user's credit score can be displayed along with a credit score ranking of (which is also "good" in this example). Also shown in FIG. 18A is a ranking for the user's debt (which is "excellent" in this example). Results of the comparison the user's current loan products compare to the market are also shown in summary fashion by the indication "yes" adjacent to the question "Am I Overpaying?" along with the amount by which the user is overpaying.

A plurality of users can sign up and receive indicators of financial responsibility. In an embodiment, each user's financial information is periodically reviewed (e.g., daily, weekly, monthly, or yearly) to determine whether the current indicator is appropriate. This can include determining whether the user has become eligible for a higher level indicator or whether the user has become eligible only for a lower level indicator. In this way, the indicators assigned to users are reflective of each user's current level of financial responsibility. In an embodiment, a user can select in advance of any changes whether to show no badge at all or whether to show only the basic level badge in the event that the user's assigned level is changed. A further option can be for the user to allow a newly assigned level of badge to be automatically be shown to others any changes in level.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A system, comprising:
a computer data store comprising a plurality of graphic icons that can be displayed on webpages over a computer network;
at least one computer server coupled to the computer data store, the at least one computer server configured to:
receive, via a webpage of the web portal, and over the computer network from a network device of a user, financial information related to the user, the financial information including an existing debt liability of the user, wherein the at least one computer server hosts the web portal including the webpage and another webpage;
perform an analysis on the financial information, wherein the analysis determines whether the existing debt liability of the user can be improved, and wherein the analysis includes:
generating at least a plurality of thousand restructured debt scenarios from the existing debt liability from the user,
selecting restructured debt scenarios for which the user qualifies based on qualification guidelines of each lender of each lending product in each restructured debt scenario from the at least plurality of thousand restructured debt scenarios, and
deriving statistical models for future levels of payments on each lending product in the selected restructured debt scenarios;
determine a level of financial responsibility of the user based on the analysis;
select a graphic icon out of the plurality of graphic icons from the computer data store, the graphic icon representing the level of financial responsibility determined for the user;
display, via the another webpage of the web portal, and over the computer network, to the network device of the user, the graphic icon associated with the level of financial responsibility determined for the user; and
provide, via the another webpage of the web portal, and over the computer network to the network device of the user, at least one of an embeddable software code or uniform resource locator (URL) web link, wherein the embeddable software code or URL web link can display the graphic icon associated with the level of financial responsibility determined for the user, over the computer network, to a network device of another party.

2. The system of claim 1, wherein the graphic icon represents a badge of financial responsibility.

3. The system of claim 1, wherein the financial information further comprises a credit report or credit score obtained from a credit reporting agency.

4. The system of claim 1, wherein the financial information further includes records related to a real property owned by the user, from computer databases maintained by public or private agencies, wherein the records includes an estimate of a value of the real property and information regarding any loans taken out on the real property.

5. The system of claim 1, wherein the financial information further comprises at least one of a loan to asset values for the user, a debt level of the user, a credit usage of the user, a ratio of debt payments to income of the user, an interest rate of a loan of the user, or a loan term of a debt of the user compared to terms of prevailing market loans.

6. The system of claim 1, wherein the financial information comprises records that describe real property of the user.

7. A non-transitory computer readable medium comprising instructions which when executed by a processing system of at least one computer server performs a method, comprising:
receiving, via a webpage of a web portal, and over a computer network from a network device of a user, financial information related to the user, the financial information including an existing debt liability of the user, wherein the at least one computer server hosts the web portal including the webpage and another webpage;
performing an analysis on the financial information, wherein the analysis determines whether the existing debt liability of the user can be improved, and wherein the analysis includes:
generating at least a plurality of thousand restructured debt scenarios from the existing debt liability from the user, selecting restructured debt scenarios for which the user qualifies based on qualification guidelines of each lender of each lending product in each restructured debt scenario from the at least plurality of thousand restructured debt scenarios, and deriving statistical models for future levels of payments on each lending product in the selected restructured debt scenarios;

determining a level of financial responsibility of the user based on the analysis;

selecting a graphic icon out of a plurality of graphic icons from a computer data store coupled to the processing system, the graphic icon representing the level of financial responsibility determined for the user;

displaying, via the another webpage of the web portal, and over the computer network, to the network device of the user, the graphic icon associated with the level of financial responsibility determined for the user; and providing, via the another webpage of the web portal, and over the computer network to the network device of the user, at least one of an embeddable software code or uniform resource locator (URL) web link, wherein the embeddable software code or URL web link can display the graphic icon associated with the level of financial responsibility determined for the user, over the computer network, to a network device of another party.

8. The non-transitory computer readable medium of claim 7, wherein the graphic icon represents a badge of financial responsibility.

9. The non-transitory computer readable medium of claim 7, wherein the financial information further comprises a credit report or credit score obtained from a credit reporting agency.

10. The non-transitory computer readable medium of claim 7, wherein the financial information further includes records related to a real property owned by the user, from computer databases maintained by public or private agencies, wherein the records includes an estimate of a value of the real property and information regarding any loans taken out on the real property.

11. The non-transitory computer readable medium of claim 7, wherein the financial information further comprises at least one of a loan to asset values for the user, a debt level of the user, a credit usage of the user, a ratio of debt payments to income of the user, an interest rate of a loan of the user, or a loan term of a debt of the user compared to terms of prevailing market loans.

12. The non-transitory computer readable medium of claim 7, wherein the financial information comprises records that describe real property of the user.

13. A method, comprising:
receiving, by at least one computer server, via a webpage of a web portal, and over a computer network from a network device of a user, financial information related to the user, the financial information including an existing debt liability of the user, wherein the at least one computer server hosts the web portal including the webpage and another webpage;

performing, by the at least one computer server, an analysis on the financial information, wherein the analysis determines whether the existing debt liability of the user can be improved, and wherein the analysis includes:

generating, by the at least one computer server, at least a plurality of thousand restructured debt scenarios from the existing debt liability from the user, selecting, by the at least one computer server, restructured debt scenarios for which the user qualifies based on qualification guidelines of each lender of each lending product in each restructured debt scenario from the at least plurality of thousand restructured debt scenarios, and deriving, by the at least one computer server, statistical models for future levels of payments on each lending product in the selected restructured debt scenarios;

determining, by the at least one computer server, a level of financial responsibility of the user based on the analysis;

selecting, by the at least one computer server, a graphic icon out of a plurality of graphic icons from a computer data store coupled to the at least one computer server, the graphic icon representing the level of financial responsibility determined for the user;

displaying, by the at least one computer server, via the another webpage of the web portal, and over the computer network, to the network device of the user, the graphic icon associated with the level of financial responsibility determined for the user;

providing, by the at least one computer server, via the another webpage of the web portal, and over the computer network to the network device of the user, at least one of an embeddable software code or uniform resource locator (URL) web link, wherein the embeddable software code or URL web link can display the graphic icon associated with the level of financial responsibility determined for the user, over the computer network, to a network device of another party.

14. The method of claim 13, wherein the graphic icon represents a badge of financial responsibility and wherein the financial information further comprises a credit report or credit score obtained from a credit reporting agency.

15. The method of claim 13, wherein the financial information further includes records related to a real property owned by the user, from computer databases maintained by public or private agencies, wherein the records includes an estimate of a value of the real property and information regarding any loans taken out on the real property.

16. The method of claim 13, wherein the financial information further comprises at least one of a loan to asset values for the user, a debt level of the user, a credit usage of the user, a ratio of debt payments to income of the user, an interest rate of a loan of the user, or a loan term of a debt of the user compared to terms of prevailing market loans.

17. The method of claim 13, wherein the financial information comprises records that describe real property of the user.

* * * * *